July 4, 1950     A. L. SEVERSON ET AL     2,513,596
CHILD'S BLOCK SET
Filed Nov. 6, 1948
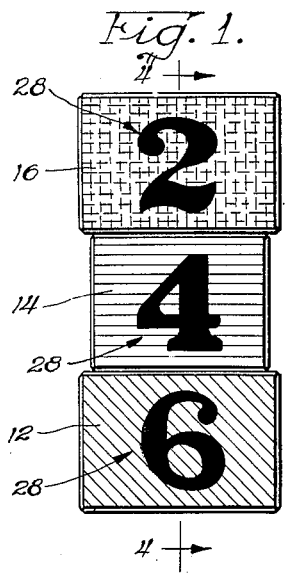
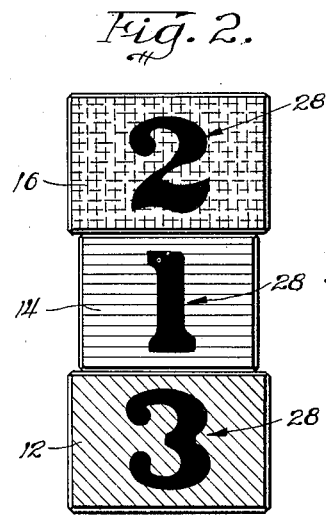
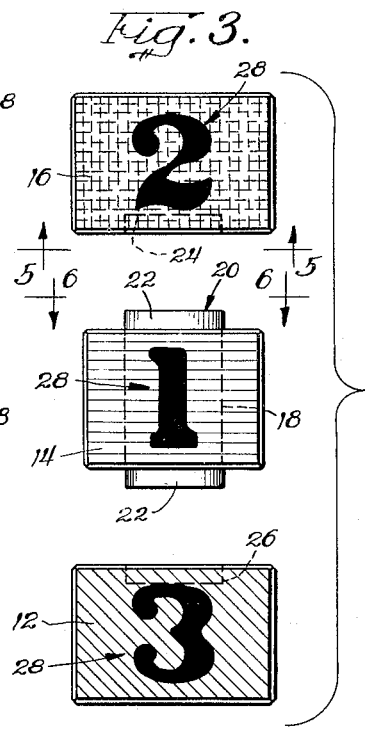
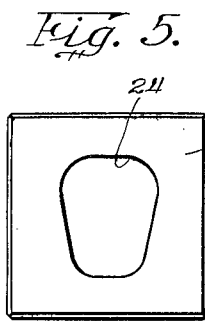
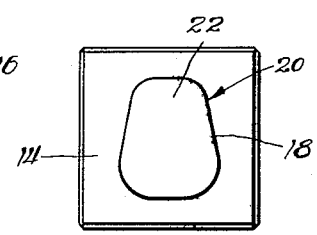
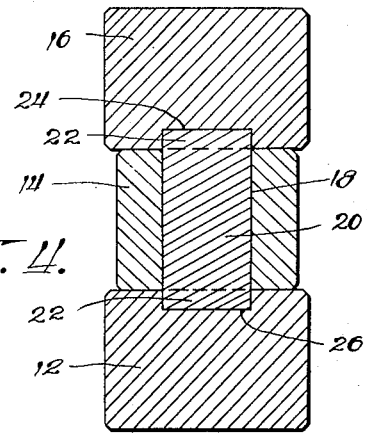
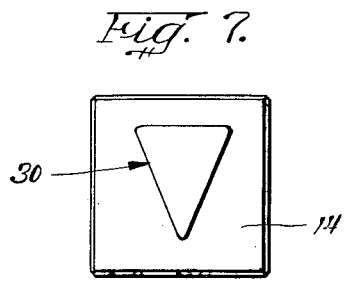
Inventors:
Alfred L. Severson
Sidney I. Sherman
By Bair + Freeman
attys Patented July 4, 1950

2,513,596

UNITED STATES PATENT OFFICE 2,513,596

CHILD'S BLOCK SET

Alfred L. Severson and Sidney L. Sherman, Chicago, Ill., assignors to The Chicago Lighthouse For The Blind, Chicago, Ill., a corporation of Illinois Application November 6, 1948, Serial No. 58,727

4 Claims. (Cl. 35—70)

This invention relates to children's blocks.

An object of the present invention is the provision of a set of blocks which are effective for educational purposes as well as for pleasure purposes.

Another object of the invention is the provision of a set of blocks having specially constructed interengaging portions by means of which the blocks are fitted together in a particular order.

A further object is the provision of a set of blocks which when fitted together, as above referred to, present number combinations and problems whereby a child will be able to learn simple arithmetic, such as simple addition.

A still further object is the provision of a set of blocks which when fitted together, as above referred to, present certain color combinations whereby a child will be able to learn such things as harmonization of colors and resultant colors produced by mixing primary colors.

Still another object is the provision of a set of blocks adapted for fitting together as above described, which are made by simple and inexpensive methods.

With these and other objects in view, our invention consists in the construction, arrangement and combination of the various parts of our device whereby the objects contemplated are attained as hereinafter more fully set forth, pointed out in the claims, and illustrated in the accompanying drawings, in which:

Figure 1 is an elevational view showing the set of blocks in stacked relation;

Figure 2 is a view from one side of Figure 1 showing other numbers represented on the blocks;

Figure 3 is an exploded view of the blocks forming the stack of Figures 1 and 2;

Figure 4 is a vertical section taken on line 4—4 in Figure 1;

Figure 5 is a view taken on line 5—5 of Figure 3;

Figure 6 is a view taken on line 6—6 of Figure 3; and

Figure 7 is a view similar to Figure 6 illustrating a different shape of interlocking piece.

Referring in detail to the drawings Figure 1 illustrates a set of blocks in stacked relation. For example the blocks are given the reference numerals 12, 14 and 16. Each of the blocks is preferably square in outline as is usual in children's building blocks. The middle block 14 is provided with a vertical hole 18 therethrough of a peculiar shape to be referred to later. A dowel pin 20 is fitted in the hole 18 with its ends extending out opposite sides of the block forming projections 22. Figure 6 shows the shape of the hole 18 and dowel pin 20. In these figures it will be noted that the shape is a modified oval having a large end and a small end. The hole and dowel pin are of the same shape and the dowel pin is secured in place by any convenient manner such as by gluing. The block 16 is providing with a cavity 24 of the same shape in cross section as the dowel pin 20. Figure 5 shows the cavity 24 being of the same shape and size as the projection 20, but in the respective views the large and small ends are in opposite relation because of the different points of view.

Similarly the block 12 is provided with a cavity 26 of the same size and shape as the cavity 24.

The blocks are fitted together in a stack as illustrated in Figures 1 and 2, the projections 22 being inserted in the cavities 24 and 26 in the respective top and bottom blocks. The cavities 24 and 26 are of such size that the projections fit thereinto with considerable ease so that a child can easily fit them together, but the fit is close enough so that the blocks will be normally held together in a stack when they are so connected.

Due to the shape of the projections 22 and the cavities 24 and 26 the blocks are fitted together in a predetermined relation, that is, the big end of the projection fits into the big end of the cavity and it is not possible to fit them together in other positions of rotation with respect to each other.

The faces of the different blocks are provided with numerals 28 imprinted thereon. The numerals are such that the sum of the numerals in the upper two blocks is indicated on the bottom block when the blocks are stacked in the intended relation. The faces of each block are imprinted with various numbers so that different combinations of addition are presented on the various aligned faces of the stack. For example in Figure 2 a problem of addition is presented which is different from that in Figure 1, and in this case the order is the same, namely, the bottom block represents the sum of the numbers on the upper two blocks. Such combinations are imprinted on all of the faces of the blocks so that various problems are represented on different sides of the stack. If desired, the order of the problem may be altered—for example, the top block may represent the total of the other two.

In addition to the arithmetical combinations represented the blocks are of different colors; for example, the top block 16 is indicated as yellow, the middle block 14 is indicated as blue and the bottom block 12 as green. The order of the colors represented is intended to also present an educational feature. Yellow and blue are primary colors and green is the secondary color resulting from a mixture of yellow and blue. The colors employed may be altered so long as the same problem exists, i. e., two primary colors and the secondary color produced by the primary colors. In this case also, the order of the colors may be altered, as for example, the color of the top block may be the secondary color resulting from the primary colors of the lower two blocks. The middle block 14 is of smaller dimensions than the top and bottom blocks. This relative size is for the purpose of appearance.

Figure 7 shows a dowel pin 30 of triangular shape for the purpose of indicating that the shape of the dowel pins may be varied. The triangle is longer in one dimension so that the top and bottom blocks will fit thereon in only one position. Different sets of blocks are provided with different shapes of dowel pins and cavities so that only those blocks of any given set can be fitted together and stacked, and when any blocks are fitted together the resulting numeral and color combinations will be correct.

Thus, according to the present invention a set of blocks is provided which is effective for furnishing pleasure to a child as is common with all building blocks, but in addition thereto it provides educational problems such as number combinations and color combinations.

While we have herein shown and described a particular embodiment of our invention, it will be understood of course that we do not wish to be limited thereto since many modifications may be made, and we therefore contemplate by the appended claims to cover any such modification or substitution of mechanical equivalents as fall within the true spirit and scope of our invention.

We claim:

1. In combination, a plurality of blocks adapted to be fitted together in a stack, at least one of said blocks having a hole therethrough, a dowel pin secured in said hole and having a portion extending out each of opposite sides of the hole, the others of said blocks having cavities therein, the ends of said pin fitting in said cavities when the blocks are stacked, said dowel pin and cavities being of similar cross sectional size and shape such that a keying interrelation is effected, whereby the blocks can be fitted together only in a single predetermined relation and the blocks are thereafter retained in such predetermined relation.

2. In combination, a set of three blocks adapted to be fitted together in a stack, the middle block having projections on opposite sides, and the other two blocks each having a cavity in one side, said projections fitting in said cavities when the blocks are stacked, said projections and cavities being of similar cross sectional shape and size whereby the blocks are locked in position with respect to rotation relative to one another, all of said blocks having numbers thereon, the number on the bottom block being the sum of the upper two, the upper two blocks being of different primary color and the bottom block being the secondary color resulting in the two primary colors.

3. In combination, a plurality of blocks each having a plurality of circumferentially arranged faces, said blocks being adapted to be fitted together in a stack, said faces being arranged around the longitudinal axis of the stack, the corresponding faces of the blocks being aligned longitudinally of the stack, said blocks having axially extending projections and cavities respectively, said projections and cavities being congruent and non-circular and interfitting in a single predetermined position of relative rotation between adjacent blocks, said blocks being adapted to be fitted together and separated by relative axial movement between the blocks, and said projections and cavities retaining said blocks against relative rotation, each set of aligned faces having numerals thereon such that successive numbers on adjacent blocks comprise an arithmetical combination.

4. In combination a plurality of blocks adapted to be fitted together in a stack having a longitudinal axis, said blocks having axially extending projections and cavities respectively, said projections and cavities being congruent and non-circular and interfitting in a single predetermined position of relative rotation between adjacent blocks, said blocks being adapted to be fitted together and separated by relative axial movement between the blocks, and said projections and cavities retaining said blocks against relative rotation, said blocks being all of different colors, all but one of said colors being primary, the blocks of said primary colors being adjacent one another, and said one color being secondary and the resultant of the combination of said primary colors.

ALFRED L. SEVERSON.
SIDNEY L. SHERMAN.

REFERENCES CITED

The following references are of record in the file of this patent:

UNITED STATES PATENTS

| Number | Name | Date |
|---|---|---|
| 384,959 | Carr | June 26, 1888 |
| 1,130,324 | Owen | Mar. 2, 1915 |
| 1,216,840 | Ramsey et al. | Feb. 20, 1917 |
| 1,396,379 | Moore | Nov. 8, 1921 |
| 1,405,010 | Russell | Jan. 31, 1922 |
| 1,472,536 | Thomson | Oct. 30, 1923 |
| 1,895,611 | Doak | Jan. 31, 1933 |
| 2,014,675 | Webster | Sept. 17, 1935 |

FOREIGN PATENTS

| Number | Country | Date |
|---|---|---|
| 78,432 | Switzerland | Jan. 2, 1919 |
| 197,004 | Switzerland | July 1, 1938 |
| 214,098 | Great Britain | Apr. 17, 1924 |
| 300,333 | Great Britain | Nov. 15, 1928 |
| 560,302 | Great Britain | Mar. 29, 1944 |